(12) United States Patent
Li

(10) Patent No.: US 6,366,402 B1
(45) Date of Patent: Apr. 2, 2002

(54) METHOD AND SYSTEM FOR PROVIDING AN IN-LINE OPTICAL CIRCULATOR

(75) Inventor: Yiqiang Li, San Jose, CA (US)

(73) Assignee: Bay Photonics, Inc., San Jose, CA (US)

( * ) Notice: Subject to any disclaimer, the term of this patent is extended or adjusted under 35 U.S.C. 154(b) by 0 days.

(21) Appl. No.: 09/728,172

(22) Filed: Dec. 1, 2000

(51) Int. Cl.[7] .................................................. G02B 5/30
(52) U.S. Cl. ......................... 359/484; 359/496; 359/497
(58) Field of Search ............................... 359/484, 495, 359/496, 497; 385/11

(56) References Cited

U.S. PATENT DOCUMENTS

| | | | | |
|---|---|---|---|---|
| 5,878,176 A | * | 3/1999 | Cheng | 385/11 |
| 6,026,202 A | * | 2/2000 | Chang | 359/497 |
| 6,111,695 A | * | 8/2000 | Lee et al. | 359/484 |

* cited by examiner

Primary Examiner—Darren Schuberg
(74) Attorney, Agent, or Firm—Sawyer Law Group LLP

(57) ABSTRACT

A method and system for providing an optical circulator is disclosed. The optical circulator includes, a first port, a second port, a third port and means for establishing a first optical path and a second optical path, the second port is opposite to the first port, while the third port is adjacent to the first port. The first optical path is from the first port to the second port, while the second optical path from the second port to the third port. The optical path establishing means include a first and a second half wave plate, a first and a second rotator pair, and a polarization beam deflector. The first rotator pair is between the first port and the first half wave plate. The second rotator pair is between the second port and the second half wave plate. The polarization beam deflector is for altering a direction of the first optical path and the second optical path. The polarization beam deflector is located between the first rotator pair and the first half wave plate. Thus, when an optical signal is input at the first port, the optical signal travels along the first optical path to the second port. When the optical signal is input to the second port, the optical signal travels along the second optical path to the third port.

19 Claims, 6 Drawing Sheets

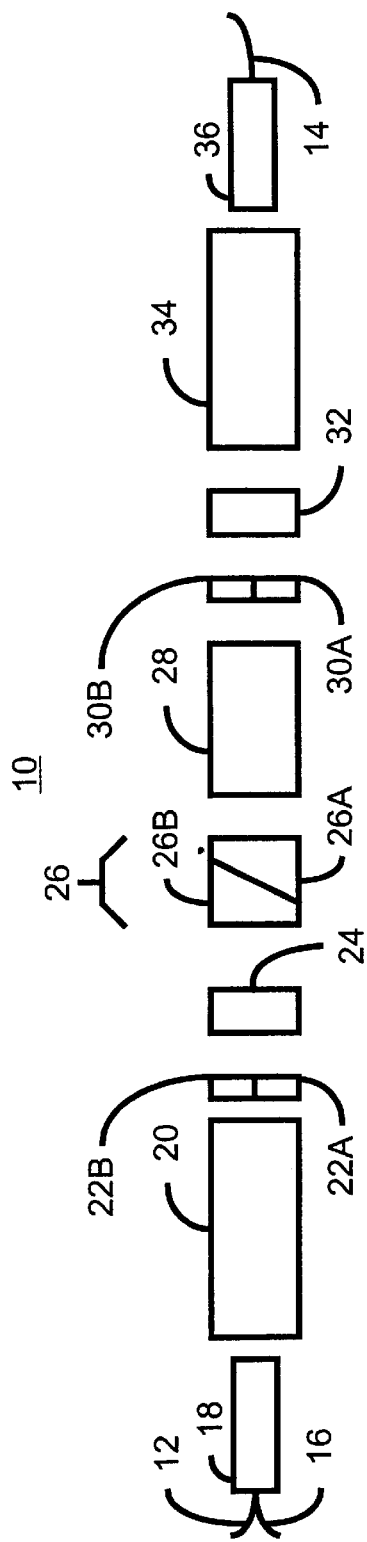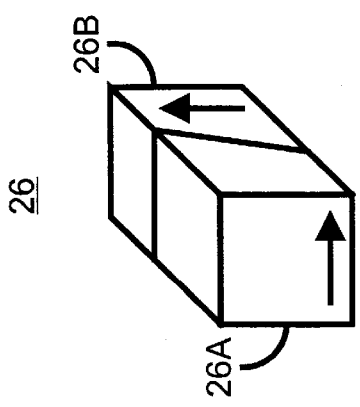
Prior Art
Figure 1A
Prior Art
Figure 1B

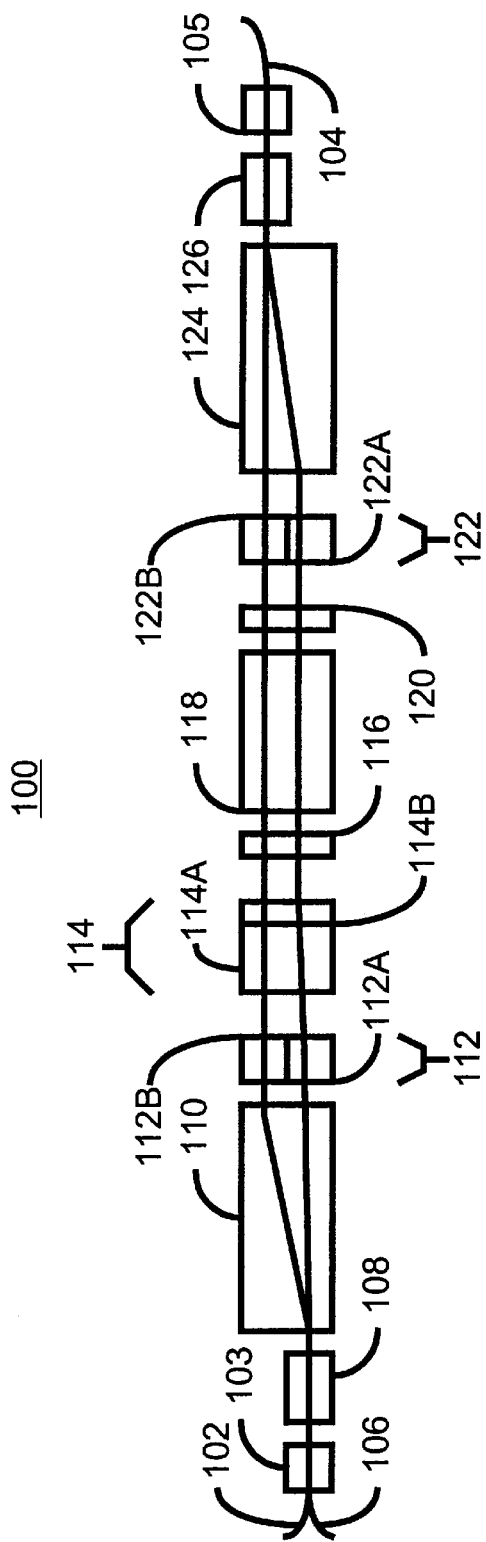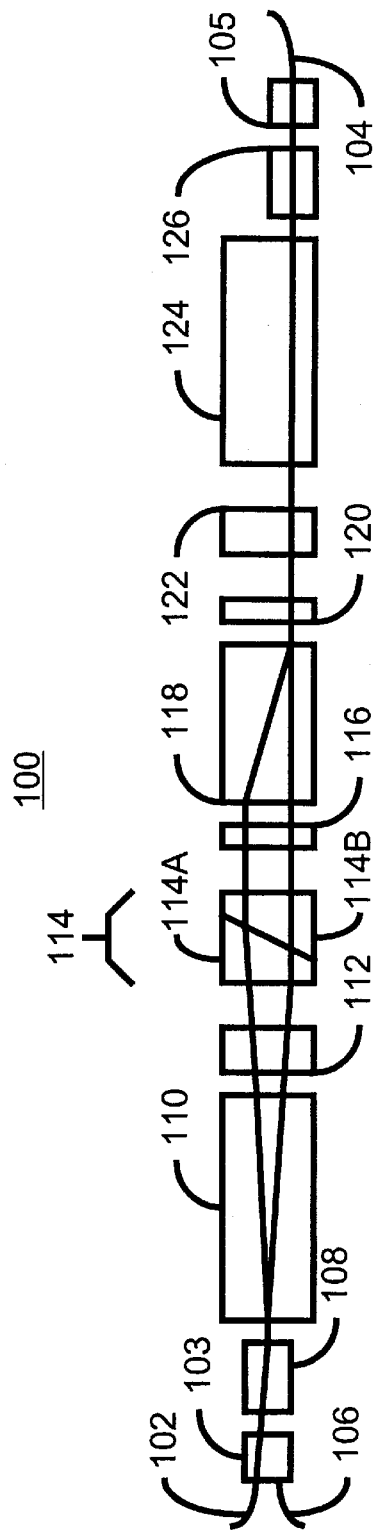
Figure 3A
Figure 3B

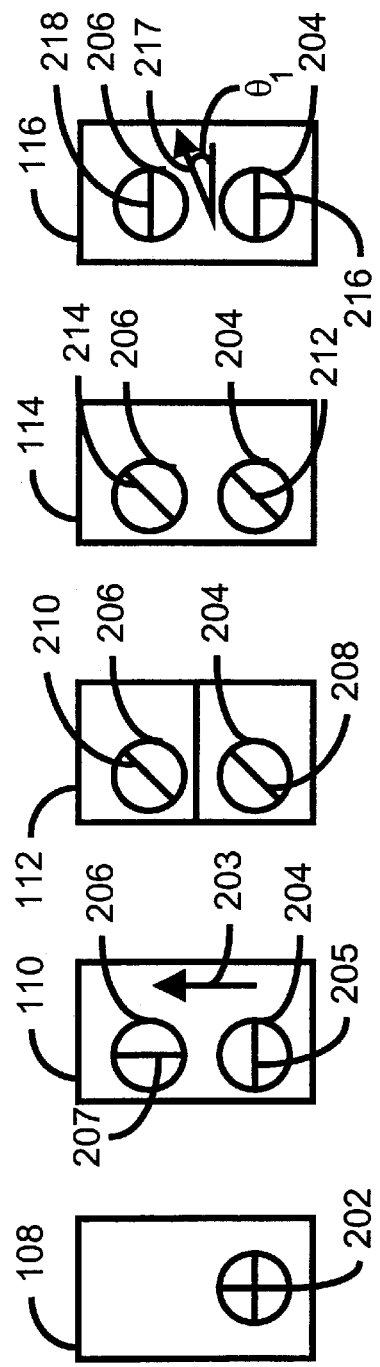

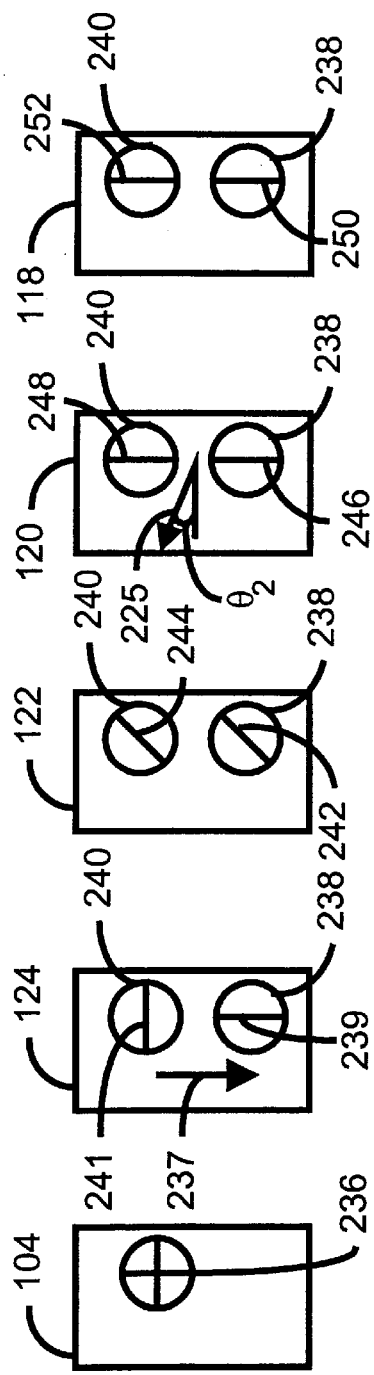

METHOD AND SYSTEM FOR PROVIDING AN IN-LINE OPTICAL CIRCULATOR

FIELD OF THE INVENTION

The present invention relates to optical technology, and more particularly to a method and system for providing an in-line optical circulator.

BACKGROUND OF THE INVENTION

Conventional optical circulators are used for many purposes. For example, conventional optical circulators may be employed in systems transmitting optical signals in order to transmit optical signals in a particular direction. In a three port optical circulator, an optical signal input at the first port will be transmitted to the second port. An optical signal input at the second port will be transmitted to the third port. However, optical signals will not be transmitted in the reverse direction. For example, an optical signal input at the second port will not be transmitted to the first port. Optical circulators can also come in a variety of configurations. One desirable configuration is an in-line optical circulator in which the first and third ports are adjacent, while the second port is at the opposing side of the system.

One prior art optical circulator is described in U.S. Pat. No. 5,909,310 by Li, et al and shown in FIG. 1A. This conventional optical in-line circulator 10 includes a first port 12, a second port 14 and a third port 16. The conventional optical in-line circulator 10 also includes a first collimator 18, a first birefringent crystal 20, a first pair of half wave plates 22A and 22B, a first Faraday rotator 24, a conventional Wollaston prism 26, a second birefringent crystal 28, a second pair of half wave plates 30A and 30B, a second Faraday rotator 30, a third birefringent crystal 34, a second collimator 36 and the fiber for the second port 14.

This conventional optical in-line circulator suffers from two disadvantages. First, the half wave plates 22A and 22D in the first pair of wave plates need to be aligned to each other. Similarly, the wave plates 30A and 30B in the second pair of wave plates also need to be aligned to each other. They are difficult to aligned respectively to each other in the manufacture process. Therefore, the alignment angular tolerance on the wave plates 22A, 22B and 30A, 30B are relatively high, which yields a lower isolation. Second, the Wollaston prism 26 is expensive and relatively more complicated to manufacture since it is composed of two wedges 26A and 26B with their optical axis parallel and perpendicular to their side direction, as shown in FIG. 1B. These two wedges 26A and 26B has to be separately manufactured and polished, then brought together to form the Wollaston prism 26. As a result, it make the manufacture process more complex and higher the cost.

U.S. Pat. No. 6,049,426 by Xie et al. ("Xie") describes another conventional in-line optical circulator. FIG. 2 depicts a conventional in-line optical circulator 50 in accordance with the teachings of Xie. It does not utilize any half wave plates, also eliminates one birefringent crystal, but uses an additional Wollaston prism 52 having wedges 52A and 52B. One of ordinary skill in the art will readily realize that the conventional in-line optical circulator 50 is relatively difficult to manufacture with higher cost. The optical circulator 50 suffers from two drawbacks. First, the optical circulator 50 uses two Wollaston prisms 26' and 52. The cost is thus increased by the additional number of Wollaston prism. Second, since the beam deflection angular tolerance introduced by Wollaston prisms is accumulated with the number of Wollaston prisms used, the beam deflection angular tolerance introduced by Wollaston prisms 26' and 52 in circulator 50 is doubled compared with the circulator with only one Wollaston prism, making optical alignment and, therefore, manufacture more difficult and complex.

Accordingly, what is needed is a system and method for providing an optical circulator that is simpler to manufacture with a lower cost. The present invention addresses such a need.

SUMMARY OF THE INVENTION

The present invention provides a method and system for providing an optical circulator. The optical circulator comprises a first port, a second port, a third port and means for establishing a first optical path and a second optical path, the second port is opposite to the first port, while the third port is adjacent to the first port. The first optical path is from the first port to the second port, while the second optical path from the second port to the third port. The optical path establishing means include a first and a second half wave plate, a first and a second rotator pair, and a polarization beam deflector. The first rotator pair is between the first port and the first half wave plate. The second rotator pair is between the second port and the second half wave plate. The polarization beam deflector is for altering a direction of the first optical path and the second optical path. The polarization beam deflector is located between the first rotator pair and the first half wave plate. Thus, when an optical signal is input at the first port, the optical signal travels along the first optical path to the second port. When the optical signal is input to the second port, the optical signal travels along the second optical path to the third port.

According to the system and method disclosed herein, the present invention provides an in-line optical circulator which can be more easily and manufactured with lower cost than conventional in-line optical circulators.

BRIEF DESCRIPTION OF THE DRAWINGS

FIG. 1A diagram of a conventional in-line optical circulator.

FIG. 1B depicts the conventional Wollaston prism often used with the conventional in-line optical circulator.

FIG. 3A depicts a side view of one embodiment of an in-line optical circulator in accordance with the present invention.

FIG. 3B its a top view of the embodiment of an in-line optical circulator in accordance with the present invention.

FIG. 5A–I depicts the polarization after particular components when the optical signal travels from the first port to the second port in one embodiment of the in-line optical circulator in accordance with the present invention.

FIG. 6A–I depicts the polarization after particular components when the in-line optical signal travels from second port to the third port in one embodiment of the optical circulator in accordance with the present invention.

DETAILED DESCRIPTION OF THE INVENTION

The present invention relates to an improvement in optical technology. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown, but is to be accorded the widest scope consistent with the principles and features described herein.

Figure 2:
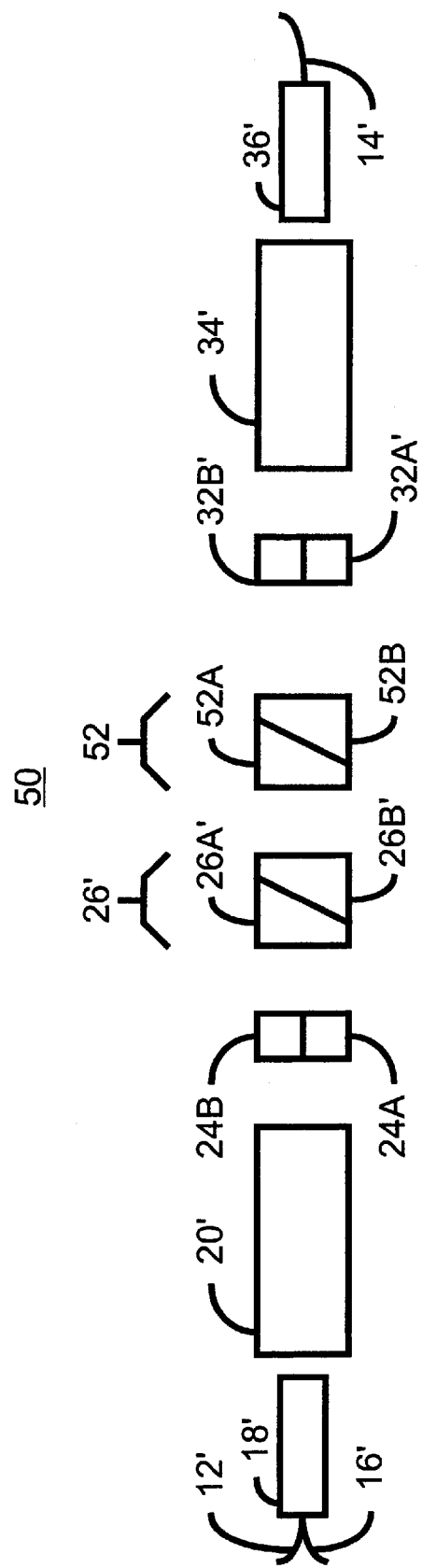
FIG. 2 depicts another conventional in-line optical circulator.

Conventional optical circulators have many uses in optical technology. A three port conventional optical circulator transmits signals from the first port to the second port, and from the second port to the third port, but not the reverse. Although the conventional optical circulators such as the conventional in-line optical circulator 10 shown in FIG. 1A and the conventional in-line optical circulator 100 shown in FIG. 2 function, one of ordinary skill in the art will readily realize that the conventional in-line optical circulators may be difficult to manufacture with a higher cost.

The present invention provides a method and system for providing an optical. The optical circulator comprises a first port, a second port, a third port and means for establishing a first optical path and a second optical path, the second port is opposite to the first port, while the third port is adjacent to the first port. The first optical path is from the first port to the second port, while the second optical path from the second port to the third port. The optical path establishing means include a first and a second half wave plate, a first and a second rotator pair, and a polarization beam deflector. The first rotator pair is between the first port and the first half wave plate. The second rotator pair is between the second port and the second half wave plate. The polarization beam deflector is for altering a direction of the first optical path and the second optical path. The polarization beam deflector is located between the first rotator pair and the first half wave plate. Thus, when an optical signal is input at the first port, the optical signal travels along the first optical path to the second port. When the optical signal is input to the second port, the optical signal travels along the second optical path to the third port.

The present invention will be described in terms of an in-line optical circulator having specific components having a specific configuration. Similarly, the present invention will be described in terms of optical circulator components having specific relationships, such as distances or angles between components. However, one of ordinary skill in the art will readily recognize that this method and system will operate effectively for other components having similar properties, other configurations, and other relationships between components.

To more particularly illustrate the method and system in accordance with the present invention, refer now to FIGS. 3A and 3B, depicting one embodiment of an optical circulator 100 in accordance with the present invention. FIG. 3A depicts a side view of the optical circulator 100. FIG. 3B depicts a top view of the optical circulator 100. Also depicted in FIGS. 3A and 3B is the optical signal input to the first port 102 and output at the second port 104 and the optical path of the optical signal from the first port 102 to the second port 104. The optical circulator 100 includes three ports, a first port 102, a second port 104 and a third port 106. The optical circulator 100 is configured such that an optical signal input to the first port 102 will be provided to the second port 104 along a first optical path (depicted in FIGS. 3A and 3B) and an optical signal input to the second port 106 will be provided to the third port 106 along a second optical path. However, an optical signal input to the first port 102 will not be transmitted to the third port 106. Similarly, an optical signal input to the second port 104 will not be provided to the first port 102.

The optical circulator 100 also includes capillaries 103 and 105 for the ports 102 and 106 and the port 104, respectively, a first collimator 108, a first birefringent material 110, a first rotator pair 112, a polarization beam deflector 114, a first half wave plate 116, a second birefringent material 118, a second half wave plate 120, a second rotator pair 122, a third birefringent material 124 and a second collimator 126. The half wave plates 116 and 120 are preferably zero order half wave plates. In addition, the optical axes of the half wave plates 116 and 120 are preferably −22.5° and +22.5°, respectively, from horizontal. The rotator pairs 112 and 122 preferably are latching type garnet. The rotator pairs 112A and 112B rotate the direction of polarization of light by 45° counter clockwise and clockwise, respectively. The optical fibers for first port 102 and third port 106 are each held by a glass capillary 103 with two capillary holes separated by a certain distance and positioned symmetrically to the center of the glass capillary 103. The optical fiber for the second port 104 is held by a glass capillary 105 with a single capillary hole located at the center of the glass capillary. The collimators 108 and 126 each include a lens. The lens used is preferably a C-lens manufactured by CASIX, Fuzhou, P.R.China. However, in another embodiment, another type of lens such as a GRIN (graduated index of refraction) lens, manufactured by NSG, Japan, can be used. When a C-lens is used, there is lower insertion loss from the lens, allowing a greater working distance between components of the optical circulator 100.

Figure 4:
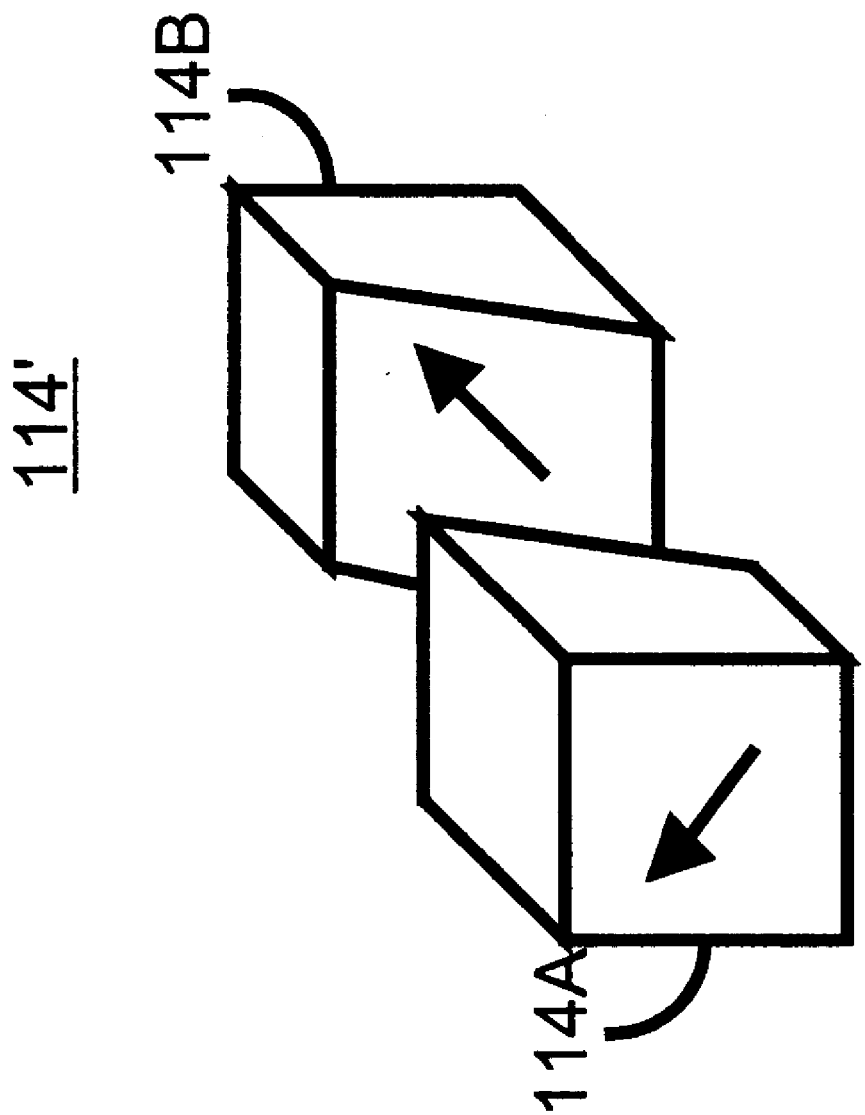
FIG. 4 is a diagram of one embodiment of a polarization beam deflector in accordance with the present invention.

The preferred polarization beam deflector 114' is depicted in FIG. 4. The preferred polarization beam deflector 114' is a modified Wollaston prism. The preferred polarization beam deflector 114' includes two wedges 114A and 114B. The wedges 114A and 114B have optical axes at 45° and −45° from vertical, as depicted in FIG. 4. Thus, the wedges 14A and 114B can be made from the same piece of material. In other words, the material can be manufactured in bulk, then the wedges 114A and 114B cut from the same piece of material. This makes the manufacturing process of the wedges 114A and 114B simpler and more cost effective. However, nothing prevents the use of another type of polarization beam deflector which changes the direction of the optical signals from being used.

FIGS. 5A–I indicate the polarizations of components of an input optical signal after being transmitted by particular components when a signal is input at the first port 102 and output at the second port 104. Referring to FIGS. 3A, 3B and 5A–I, the function of one embodiment of the optical circulator 100 having an optical signal input at the first port 102 is described. An optical signal 202 can be decomposed into two states having orthogonal polarization, as depicted in FIG. 5A. After collimation by the collimator 108, the optical signal 202 is provided to the first birefringent material 110. The first birefringent material 110 allows the first polarization state 204 to be transmitted undeflected, but walks off the second polarization state 206 (vertically polarized in this embodiment), as depicted in FIG. 5B. The direction that the first birefringent material 110 walks off the second polarization state 206 from a signal input at the first port 102 is upward, as shown by the arrow 203. The first polarization state 204 has a horizontal polarization 205, while the second polarization state 206 has a vertical polarization 207. In addition, both the first polarization state 204 and the second polarization state 206 are walked off horizontally because the beam exiting from the first collimator 108 is angled. The first pair of rotators 112 then rotates the first and second polarization states by 45° counter clockwise and clockwise, respectively. Thus, as depicted in FIG. 5C, the first polarization state 204 and the second polarization state 206 have the same polarization 208 and 210, respectively. These polarizations 208 and 210 are 45° clockwise from vertical. As shown in FIG. 5D, the first polarization state 204 and the second polarization state 206 are then deflected by the polarization beam deflector 114. Thus, although the first polarization state 204 and the second polarization state 206 are not offset spatially by the polarization beam deflector 114 and have the same polarizations 212 and 214, respectively, they are angularly deflected.

FIG. 5E depicts the first polarization state 204 and the second polarization state 206 after transmission through the first half wave plate 116. The first half wave plate 116 has an optical axis 217 that is at an angle $\Theta_1$, 22.5° counterclockwise from horizontal as shown in FIG. 5E. Because of this configuration of the first half wave plate 116, the polarizations of the first polarization state 204 and the second polarization state 206 are rotated clockwise by 45°, to horizontal. Thus, the first polarization state 204 has a horizontal polarization 216 and the second polarization state 206 has a horizontal polarization 218.

FIG. 5F depicts the first polarization state 204 and the second polarization state 206 when exiting the second birefringent material 118. Both the first polarization state 204 and the second polarization state 206 are walked-off horizontally by a distance due to the second birefringent material 118. However, both the first polarization state 204 and the second polarization state 206 have horizontal polarizations 220 and 222, respectively. The direction that the second birefringent material 118 walks off the first polarization state 204 and the second polarization state 206 which are both horizontally polarized and from a signal input at the first port 1=02 is right as shown by the arrow 221.

FIG. 5G depicts the first polarization state 204 and the second polarization state 206 when exiting the second half wave plate 120. The second half wave plate 120 has an optical axis 225 that is at an angle $\Theta_2$, 22.5° clockwise from horizontal as shown in FIG. 5G. Because of the configuration of the second half wave plate 120, the polarizations of the first polarization state 204 and the second polarization state 206 have polarizations 224 and 226, respectively, that are rotated clockwise by 45° from horizontal.

FIG. 5H depicts the first polarization state 204 and the second polarization state 206 when exiting the second pair of rotators 122. The second pair of rotators 122 rotates the first and second polarization states by 45° clockwise and counter clockwise, respectively. Thus, the first polarization state 204 has a polarization 228 that is vertical, while the second polarization state 206 has a polarization 230 that is horizontal.

FIG. 5I depicts the first polarization state 204 and the second polarization state 206 when exiting the third birefringent material 124. The first polarization state 204 (polarized vertically) is walked off such that the first polarization state 204 is walked off to the position of the second polarization state 206. The direction that the third birefringent material 124 walks off the first polarization state 204 from a signal input at the first port 102 is upward, as shown by the arrow 233. Thus, the first polarization state 204 coincides with and has the same direction of propagation as the second polarization state 206, allowing the two states to recombine into a single optical signal that has components with a vertical polarization 232 and a horizontal polarization 234.

FIGS. 6A–I depict the polarization and location of the optical signal after particular components when the optical signal travels from the second port 104 to the first port 102 in one embodiment of the optical circulator in accordance with the present invention. Referring to FIGS. 3A, 3B and 6A–I, the function one embodiment of the optical circulator 100 having an optical signal input at the second port 104 is described. An optical signal 236 can be decomposed into two states having orthogonal polarization, as depicted in FIG. 6A. After collimation by the collimator 126, the optical signal 236 is provided to the third birefringent material 124. The third birefringent material 124 allows the first polarization state 238 to be walked off vertically downward, but transmits undeflected the second polarization state 240, as depicted in FIG. 6B. The direction that the third birefringent material 124 walks off the first polarization state 238 from a signal input at the second port 104 is downward, as shown by the arrow 237. In this embodiment, the first polarization state 238 has a vertical polarization 239 while the second polarization state 240 has a horizontal polarization 241.

The second pair of rotators 122 then rotates the first and second polarization states by 45° clockwise and counter clockwise, respectively. Thus, as depicted in FIG. 6C, the first polarization state 238 and the second polarization state 240 have the same polarizations 242 and 244, respectively. The polarizations 242 and 244 are 45° clockwise from vertical.

FIG. 6D depicts the first polarization state 238 and the second polarization state 240 when exiting the second half wave plate 120. Because of the configuration of the second half wave plate 120, the optical axis 225 and the angle $\Theta_2$, the polarizations of the first polarization state 238 and the second polarization state 240 are rotated counter clockwise by 45°. Thus, both the first polarization state 238 and the second polarization state 240 have polarizations 246 and 248 that are vertical.

FIG. 6E depicts the first polarization state 238 and the second polarization state 240 when exiting the second birefringent material 118. Both the first polarization state 238 and the second polarization state 240 are not walked off by the birefringent material 118. In addition, the polarization of the first polarization state 238 and the second polarization sate 240 are unchanged, having polarizations 250 and 252 that are vertical.

FIG. 6F depicts the first polarization state 238 and the second polarization state 240 after transmission through the first half wave plate 116. Because of the configuration of the first half wave plate 116, the optical axis 217 and the angle $\Theta_1$, the polarizations of the first polarization state 238 and the second polarization state 240 are rotated counter clockwise by 45°. Thus, the first polarization state 238 has a polarization 254 that is 45° counter clockwise from vertical. Similarly, the second polarizations state 240 has a polarization 256 that is 45° counter clockwise from vertical.

FIG. 6G depicts the first polarization state 238 and the second polarization state 240 after transmission by the polarization beam deflector 114. The first polarization state 238 and the second polarization state 240 are deflected by the polarization beam deflector 114. Thus, although the first polarization state 238 and the second polarization state 240 are not offset spatially by the polarization beam deflector 114 and have the same polarization, they are angularly deflected. Thus, the polarization 258 of the first polarization state 238 and the polarization 260 of the second polarization state 240 are 45° counter clockwise from vertical.

FIG. 6H depicts the first polarization state 238 and the second polarization state 240 when exiting the first pair of rotators 112. The first pair of rotators 112 rotates the first polarization state 238 and the second polarization state 240 by 45° counter clockwise and clockwise, respectively. Thus, the first polarization state 238 has a polarization 262 that is horizontal, while the second polarization state 240 has a polarization 264 that is vertical.

FIG. 6I depicts the first polarization state 238 and the second polarization state 240 when exiting the first birefringent material 110. The first polarization state 238 is spatially undeflected and has a polarization 266 that is horizontal. However, the second polarization 240, which has a polarization 268 that is vertical, is walked off to the position of the first polarization state 238. The direction that the first birefringent material 110 walks off the second polarization state 240 from a signal input at the second port 104 is downward, as shown by the arrow 267. Thus, the first polarization state 238 coincides with and has the same direction of propagation as the second polarization state 240, allowing the two states to recombine into a single optical signal.

Thus, the optical circulator 100 functions. In addition, the configuration of elements and elements used in the optical circulator provide several advantages. Because a signal input to the first port 102 or the second port 104 encounters the first pair of rotators 112 or the second pair of rotators 122 before encountering the first half wave plate 116 or the second half wave plate 120, respectively, the optical axis alignment is simpler. The first pair of rotators 112 and the second pair of rotators 122 rotate the polarizations of optical signals to a specific direction with a specific angular amount no matter how they are physically aligned to each other. As a result, the polarization of the portions of the optical signals (i.e. the first and second polarization states) that will reach the half wave plates 116 or 120 are known based on the polarization rotation amount and direction for the first and second pair of rotators 112 or 122, respectively. Thus, the half wave plates 116 and 120 can be aligned using other nearby components, such as the rotators 112 or 122, respectively. Consequently, alignment of the first pair of rotators 112, the second pair of rotators 122 and the half wave plates 116 and 120 is greatly simplified. In addition, if the preferred polarization beam deflector 114' is utilized, manufacturing is further benefited. As described above, the wedges 114A and 114B may be provided from the same piece of material because they are mirror images of each other not only in shape, but also in the direction of the optic axes. The polarization beam deflector 114' and, therefore, the optical circulator 100 is relatively simple to manufacture and lower in cost. Furthermore, when latching type garnet rotators 112A, 112B, 122A and 122B are used, the footprint of the optical circulator 100 can be further reduced. Moreover, when C-lenses are used in the collimators 108 and 126, a lower insertion loss can be achieved. Thus, the optical circulator 100 in accordance with the present invention is more easily manufactured and has a lower cost than a conventional system. In addition, the optical circulator 100 may have a smaller footprint and a lower insertion loss.

A method and system has been disclosed for providing an optical circulator which may have low losses and be low in cost to manufacture. Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. An optical circulator comprising:
   a first port;
   a second port opposite to the first port;
   a third port adjacent to the first port;
   means for establishing a first optical path and a second optical path, the first optical path from the first port to the second port, the second optical path from the second port to the third port such that when an optical signal is input at the first port the optical signal travels along the first optical path to the second port and when the optical signal is input to the second port the optical signal travels along the second optical path to the third port, the optical path establishing means including
   a first half wave plate and a second half wave plate;
   a first rotator pair and a second rotator pair, the first rotator pair being between the first port and the first half wave plate, the second rotator pair being between the second port and the second half wave plate,
   a polarization beam deflector for altering a direction of the first optical path and the second optical path, the polarization beam deflector being located between the first rotator pair and the first half wave plate.

2. The optical circulator of claim 1 wherein the polarization beam deflector further includes a first wedge and a second wedge, the first wedge having a first face and a first optic axis, the second wedge having a second face and a second optic axis, the first optical path and a second optical path passing through the first face and the second face, the first optic axis being in 45° from vertical on the first face and in a plane perpendicular to the first optical path and the second optical path, the second optic axis being −45° from vertical in the second face and in the plane perpendicular to the first optical path and the second optical path, the first optic axis and second optic axis being orthogonal.

3. The optical circulator of claim 1 wherein the first rotator further includes a first latching type garnet component and second latching type garnet component and wherein the second rotator further includes a third latching type garnet component and fourth latching type garnet component, the first latching type garnet component rotating a polarization of an optical signal by 45° in a first direction, the second latching type garnet component rotating the polarization of the optical signal by 45° in a second direction opposite to the first direction, the third latching type garnet component rotating a polarization of an optical signal by 45° in the second direction, the fourth latching type garnet component rotating the polarization of the optical signal by 45° in the first direction.

4. The optical circulator of claim 1 wherein the optical path establishing means further comprise a first birefringent material intersecting the first optical path and the second optical path and being disposed between the first half wave plate and the second half wave plate, the first birefringent material for ensuring that the second optical path includes the third port but not the first port and for ensuring that the first optical path includes the second port.

5. The optical circulator of claim 1 wherein the optical signal is capable of being decomposed into a first portion having a first polarization and a second portion having a second polarization the optical path establishing means further comprise:
   a second birefringent material disposed between the first port and the first pair of rotators, the second birefringent material for allowing a first polarization state to be transmitted undeflected and a second polarization state to be transmitted with after being walked off by a first distance.

6. The optical circulator of claim 5 wherein the optical path establishing means further comprise:
   a third birefringent material disposed between the second half wave plate and the second port, the third birefringent material for allowing the second polarization state to be transmitted undeflected and the first polarization state to be transmitted with after being walked off by a second distance equal and opposite to the first distance.

7. The optical circulator of claim 1 wherein the first port further includes a first fiber, the second port includes a second fiber, and the third port includes a third fiber.

8. The optical circulator of claim 1 further comprising a first collimator coupled to the first port and the third port, the first collimator including a C-lens or a GRIN lens.

9. The optical circulator of claim 8 further comprising a second collimator coupled to the second port, the second collimator including a C-lens or a GRIN lens.

10. An optical circulator for use with an optical signal capable of being decomposed into a first portion having a first polarization and a second portion having a second polarization, the optical signal comprising:
   a first port;
   a second port opposite to the first port;
   a third port adjacent to the first port;
   a first half wave plate and a second half wave plate;
   a first rotator pair and a second rotator pair, the first rotator pair being between the first port and the first half wave plate, the second rotator pair being between the second port and the second half wave plate,
   a first birefringent material disposed between the first port and the first pair of rotators, the first birefringent material for allowing a first polarization state to be transmitted undeflected and a second polarization state to be transmitted after being walked off by a first distance;
   a polarization beam deflector for altering a direction of a first optical path and a second optical path, the polarization beam deflector being located between the first rotator pair and the first half wave plate, the polarization beam deflector including a first wedge and a second wedge, the first wedge having a first face and a first optic axis, the second wedge having a second face and a second optic axis, the first optical path and a second optical path passing through the first face and the second face, the first optic axis being in 45° from vertical on the first face and in a plane perpendicular to the first optical path and the second optical path, the second optic axis being −45° from vertical in the second face and in the plane perpendicular to the first optical path and the second optical path, the first optic axis and second optic axis being orthogonal;
   a second birefringent material intersecting the first optical path and the second optical path and being disposed between the first half wave plate and the second half wave plate, the second birefringent material for ensuring that the second optical path includes the third port but not the first port and for ensuring that the first optical path includes the second port;
   a third birefringent material disposed between the second half wave plate and the second port, the third birefringent material for allowing the second polarization state to be transmitted undeflected and the first polarization state to be transmitted after being walked off by a second distance equal and opposite to the first distance; such that when an optical signal is input at the first port the optical signal travels along a first optical path to the second port and when the optical signal is input to the second port the optical signal travels along a second optical path to the third port.

11. A method utilizing an optical circulator, the optical circulator including a first port, a second port and a third port adjacent to the first port, the method comprising the steps of:
   (a) inputting the optical signal to a first port or a second port opposite to the first port;
   (b) transmitting the optical signal through a means for establishing a first optical path and a second optical path such that when an optical signal is input at the first port the optical signal travels along the first optical path to the second port and when the optical signal is input to the second port the optical signal travels along the second optical path to the third port, the first optical path from the first port to the second port, the second optical path from the second port to the third port, the optical path establishing means including a first half wave plate and a second half wave plate, a first rotator pair and a second rotator pair and a polarization beam deflector for altering a direction of the first optical path and the second optical path, the first rotator pair being between the first port and the first half wave plate, the second rotator pair being between the second port and the second half wave plate, the polarization beam deflector being located between the first rotator pair and the first half wave plate.

12. The method of claim 11 wherein the polarization beam deflector includes a modified Wollaston prism having a first wedge and a second wedge, the first wedge having a first face and a first optic axis, the second wedge having a second face and a second optic axis, the first optical path and a second optical path passing through the first face and the second face, the first optic axis being in 45° from vertical on the first face and in a plane perpendicular to the first optical path and the second optical path, the second optic axis being negative 45° from vertical in the second face and in the plane perpendicular to the first optical path and the second optical path, the first optic axis and second optic axis being orthogonal.

13. The method of claim 11 wherein the first rotator further includes a first latching type garnet component and second latching type component and wherein the second rotator further includes a third latching type garnet component and fourth latching type garnet component, the first latching type garnet component rotating a polarization of an optical signal by 45° in a first direction, the second latching type garnet component rotating the polarization of the optical signal by 45° in a second direction opposite to the first direction, the third latching type garnet component rotating a polarization of an optical signal by 45° in the second direction, the fourth latching type garnet component rotating the polarization of the optical signal by 45° in the first direction.

14. The method of claim 11 wherein the optical path establishing means further comprise a first birefringent material intersecting the first optical path and the second optical path and being disposed between the first half wave plate and the second half wave plate, the first birefringent material for ensuring that the second optical path includes the third port but not the first port and for ensuring that the first optical path includes the second port.

15. The method of claim 11 wherein the optical signal is capable of being decomposed into a first portion having a first polarization and a second portion having a second polarization the optical path establishing means further comprise:

a second birefringent material disposed between the first port and the first pair of rotators, the second birefringent material for allowing a first polarization state to be transmitted undeflected and a second polarization state to be walked off by a first distance.

16. The method of claim 15 wherein the optical path establishing means further comprise:

a third birefringent material disposed between the second half wave plate and the second port, the third birefringent material for allowing the second polarization state to be transmitted undeflected and the first polarization state to be transmitted after being walked off by a second distance equal and opposite to the first distance.

17. The method of claim 11 wherein the first port further includes a first fiber, the second port includes a second fiber, and the third port includes a third fiber.

18. The method of claim 11 wherein the optical circulator further includes a first collimator coupled to the first port and the third port, the first collimator including a C-lens or a GRIN lens.

19. The method of claim 18 wherein the optical circulator further includes a second collimator coupled to the second port, the second collimator including a C-lens or a GRIN lens.

* * * * *